(12) United States Patent
Stewart et al.

(10) Patent No.: US 7,527,464 B2
(45) Date of Patent: May 5, 2009

(54) FASTENER ASSEMBLY AND METHOD OF MANUFACTURE

(75) Inventors: Robert E. Stewart, Farmington Hills, MI (US); Carl L. Lewis, Sterling Heights, MI (US)

(73) Assignee: Alpha Stamping Company, Livonia, MI (US)

( * ) Notice: Subject to any disclaimer, the term of this patent is extended or adjusted under 35 U.S.C. 154(b) by 673 days.

(21) Appl. No.: 11/058,975

(22) Filed: Feb. 16, 2005

(65) Prior Publication Data

US 2006/0179785 A1 Aug. 17, 2006

(51) Int. Cl.
*F16B 35/00* (2006.01)
(52) U.S. Cl. ........................................ 411/107; 411/970
(58) Field of Classification Search ................. 411/107, 411/112, 183, 970
See application file for complete search history.

(56) References Cited

U.S. PATENT DOCUMENTS

| | | | | | |
|---|---|---|---|---|---|
| 2,346,712 | A | * | 4/1944 | Tinnerman | 248/71 |
| 2,853,113 | A | * | 9/1958 | Balint et al. | 411/103 |
| 3,049,369 | A | * | 8/1962 | Trafton | 403/252 |
| 3,496,980 | A | * | 2/1970 | Kring et al. | 411/112 |
| 4,270,591 | A | * | 6/1981 | Gill et al. | 411/112 |
| 5,934,851 | A | * | 8/1999 | Stewart et al. | 411/183 |
| 5,971,686 | A | * | 10/1999 | Stewart et al. | 411/120 |
| 6,799,929 | B2 | * | 10/2004 | Oates et al. | 411/121 |

* cited by examiner

*Primary Examiner*—Flemming Saether
(74) *Attorney, Agent, or Firm*—Reising Ethington P.C.

(57) ABSTRACT

A fastener assembly includes a retainer clip having a base, a deck spaced from the base and an opening in the base aligned with the deck. A threaded fastener has a head received through the opening in the base and non-rotatably secured to the deck, and an externally threaded body that extends through the opening in the base.

10 Claims, 3 Drawing Sheets

FASTENER ASSEMBLY AND METHOD OF MANUFACTURE

The present disclosure is directed to fastener assemblies of the type that include a threaded fastener assembled to a retainer clip for securing the assembly to a wall panel, and to a method of making such a fastener assembly.

BACKGROUND AND SUMMARY OF THE INVENTIONS

Fastener assemblies of the subject type generally include a threaded fastener such as a bolt assembled to a retainer clip for securement as an assembly to a wall panel or the like. The objective is to allow securement of one or more objects to the threaded portion of the fastener in an environment in which one does not have access to the head of the fastener for tightening a nut or the like onto the fastener. A general object of the present disclosure is to provide a fastener assembly, a fastener system that includes such an assembly and/or a method of making a fastener assembly having reduced cost and improved durability as compared with conventional assemblies of this type.

The present disclosure involves a number of aspects or inventions that can be implemented separately from or in combination with each other.

In accordance with one aspect of the present disclosure, a fastener assembly includes a retainer clip having a base, a deck spaced from the base and an opening in the base aligned with the deck. A threaded fastener has a head received through the opening in the base and non-rotatably secured to the deck, and an externally threaded body that extends through the opening in the base.

In accordance with another aspect of the present disclosure, a fastener assembly includes a retainer clip having a flat base, a deck spaced from the base, a hexagonal opening in the deck and an opening in the base aligned with the hexagonal opening in the deck. A flange bolt has a hexagonal head received through the opening in the base into the hexagonal opening in the deck, a flange disposed adjacent to the deck between the deck and the base, and an externally threaded body extending from the flange through the opening in the base. The hexagonal head of the bolt preferably is secured to the deck by staked deformations at the corners of the bolt head.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
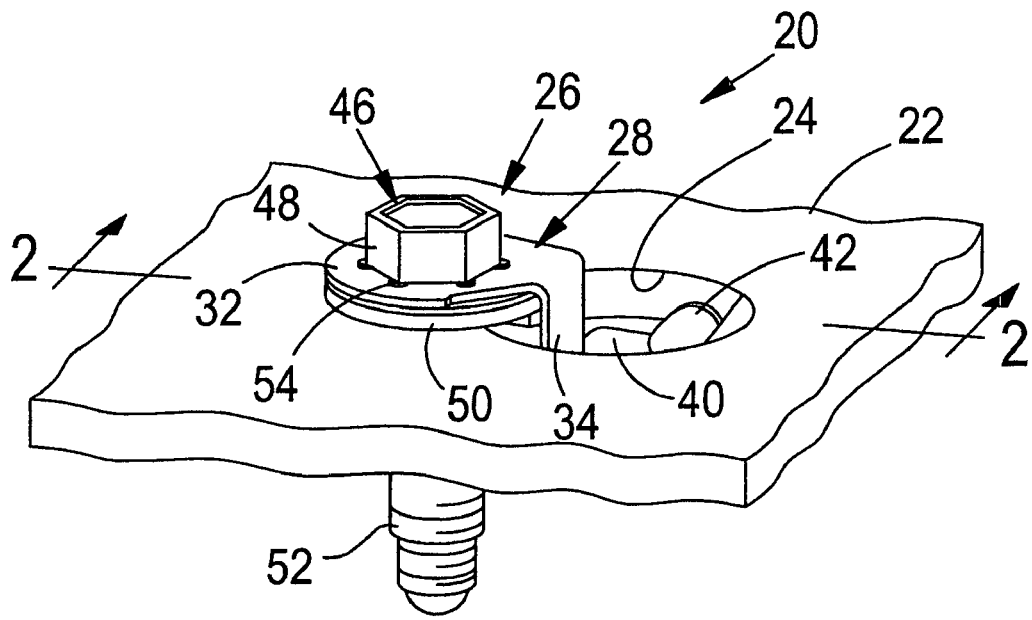
FIG. 1 is a fragmentary perspective view of a fastener system that includes a fastener assembly in accordance with one embodiment of the present disclosure.
Figure 2:
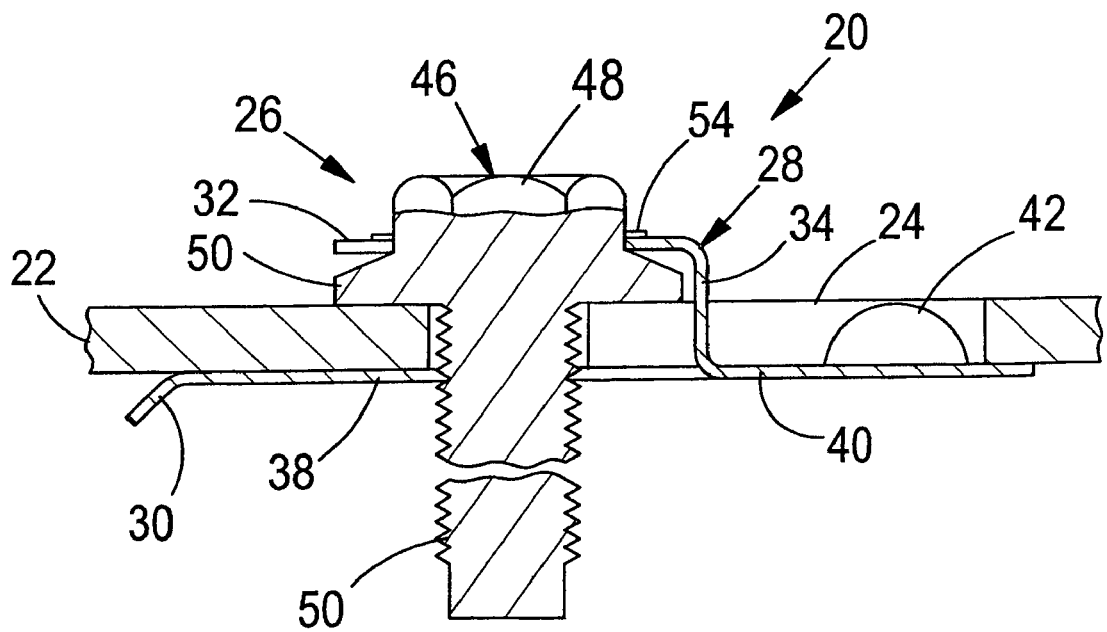
FIG. 2 is a fragmentary sectional view taken substantially along the line 2-2 in FIG. 1.
Figure 3:
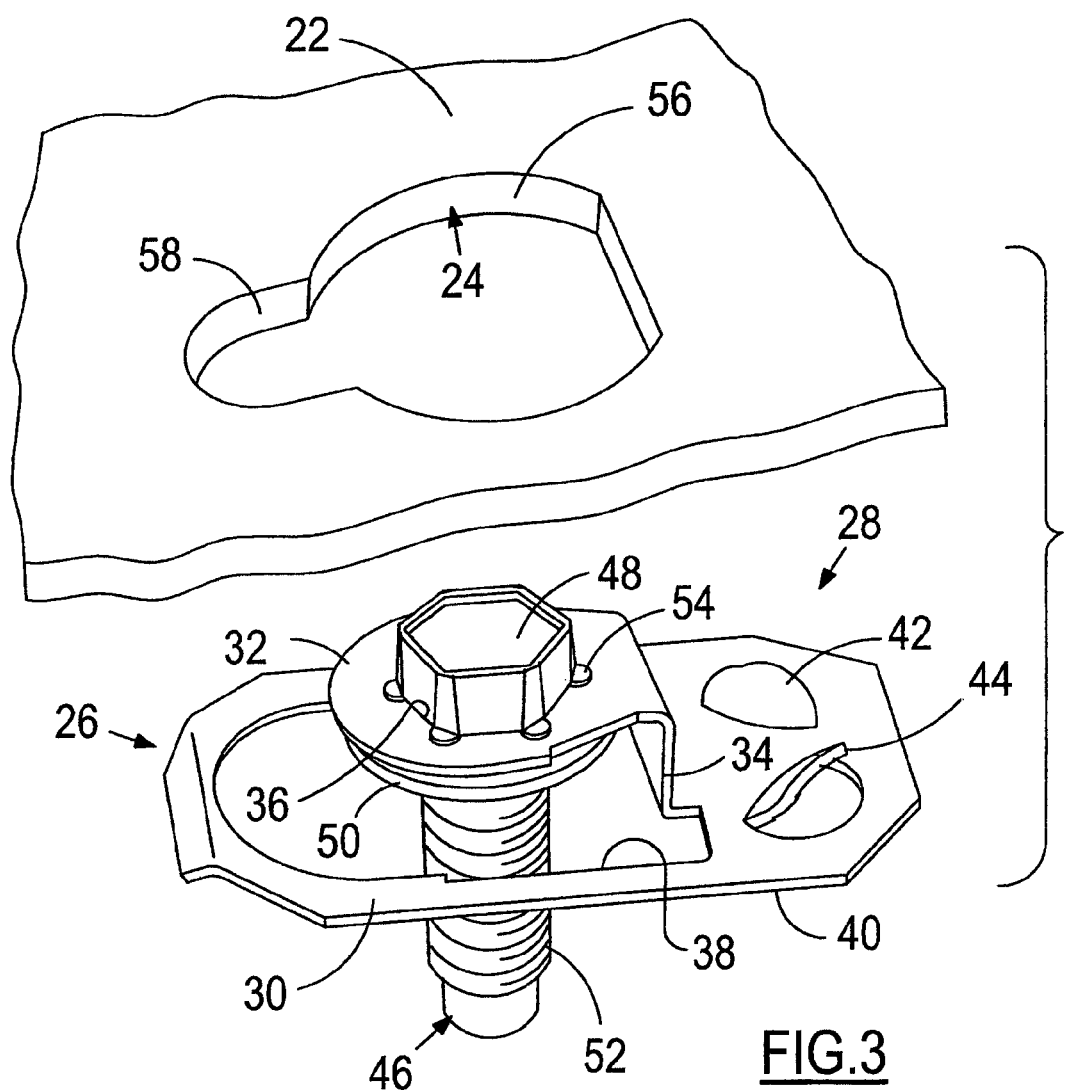
FIG. 3 is an exploded perspective view of the fastener system of FIG. 1.
Figure 4:
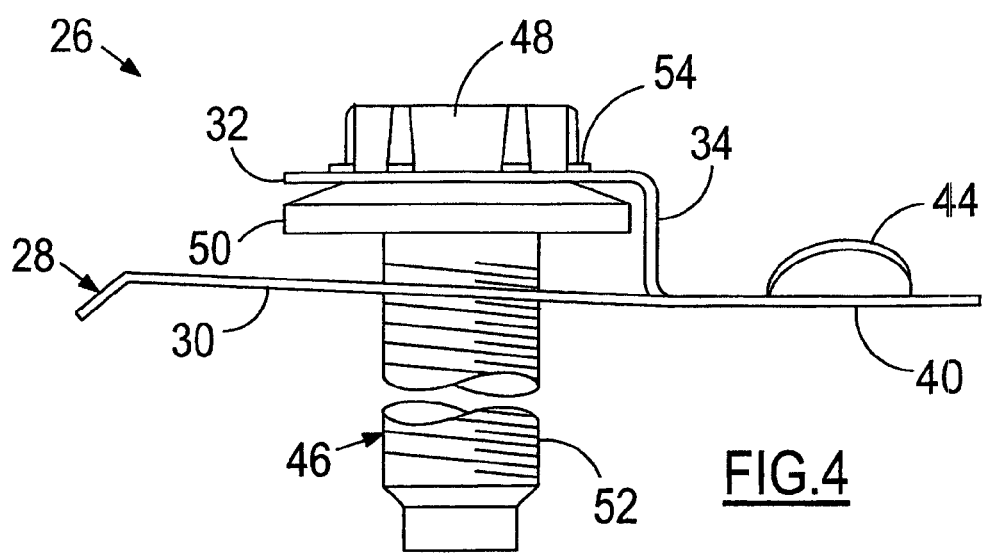
FIG. 4 is a fragmentary side elevational view of the fastener assembly in the system of FIGS. 1-3.
Figure 5:
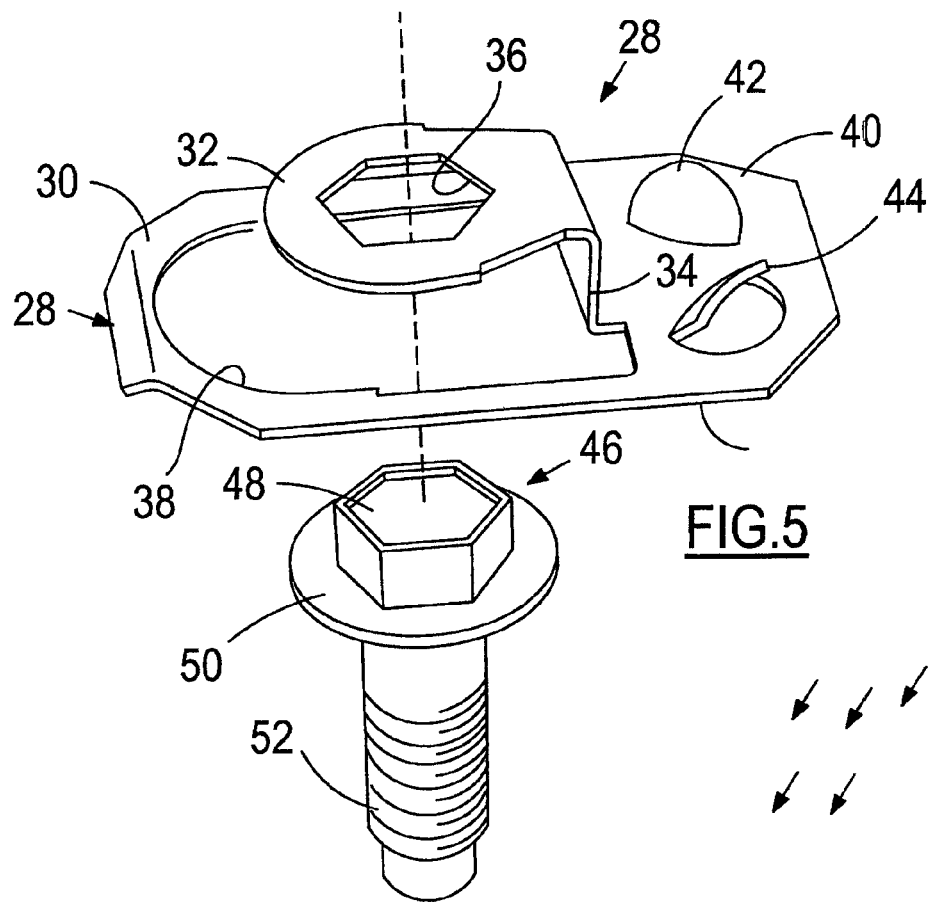
FIG. 5 is an exploded perspective view of the fastener assembly in FIG. 4.

FIGS. 1-3 illustrate a fastener system 20 as including a wall or panel 22 having a keyhole-shaped opening 24, within which is secured a fastener assembly 26 in accordance with a presently preferred embodiment of the disclosure. FIGS. 4 and 5 show fastener assembly 26 in greater detail. Fastener assembly 26 includes a retainer clip 28 having a base 30 and a deck 32 upstanding from base 30. Base 30 and deck 32 preferably are flat, and preferably are angled slightly toward each other as shown in FIG. 4. Deck 32 preferably is connected to base 30 by means of an integral wall 34. Deck 32 has a non-round opening 36, preferably of hexagonal contour, that is aligned with an opening 38 in base 30. Base 30 has an extension 40 that preferably is flat and parallel to deck 32. A pair of flexible resilient tangs 42,44 are upstanding from extension 40. Tangs 42, 44 may be planar or arcuate in construction, and are disposed at an acute angle to each other. At least the edges of tangs 42,44 remote from deck 32 are rounded, for purposes to be described. In the preferred embodiment illustrated in the drawings, the entire edges of tangs 42,44 are rounded in construction.

A threaded fastener 46 is secured to retainer clip 28. In the preferred embodiment of the invention illustrated in FIGS. 1-5, threaded fastener 46 is a hex flange bolt having a hexagonal head 48 closely received within hexagonal opening 36 on deck 32, which prevents rotation of fastener 46 with respect to clip 28. A flange 50 formed integrally with fastener 46 underlies deck 32 between deck 32 and base 30. An externally threaded body 52 integrally extends from flange 50 through opening 38 in base 30.

Clip 28 may be formed in a suitable blanking and bending operation from a sheet or strip of spring steel, for example. Head 48 of fastener 46 is inserted through opening 38 in clip base 30 and then into hexagonal opening 36 on clip deck 32. Head 48 preferably is secured to clip 28, most preferably by means of staked deformations 54 formed at the corners of hexagonal head 48. Thus, fastener 46 is firmly assembled to deck 32 of clip 28 by means of flange 50 disposed on the underside of deck 32 and staked corners 54 against the upper surface of deck 32. Fastener assembly 26 is then ready for use.

In use, fastener assembly 26 preferably is used in combination with keyhole-shaped opening 24 in wall or panel 22 to which the fastener assembly is to be secured. As best seen in FIG. 3, opening 24 has an enlarged portion 56 and a small portion 58 extending laterally from enlarged portion 56. To secure fastener assembly 26 to wall 22, deck 32 and head 48 are inserted through enlarged portion 56 of opening 24, and assembly 26 is then moved laterally with respect to wall 22 (to the left in FIGS. 1-2) until body 52 of fastener 46 is disposed within small portion 58 of keyhole-shaped opening 24 and tangs 42, 44 are snapped into enlarged portion 56 of keyhole-shaped opening 24. The parallel side edges of base 30 resiliently flex so that base 30 is parallel or near parallel to deck 32 in use. Tangs 42, 44 are disposed adjacent to the side edges of opening portion 56 and prevent rotation of fastener assembly 26 with respect to wall 22. The undersurface of flange 50 is engaged with one surface of wall 22, and base 30 and extension 40 are engaged with the opposing surface of the wall. Externally threaded body 52 of fastener 46 is exposed for securement of one or more objects to wall 22. If it is desired to remove fastener assembly 26 from wall 22, the fastener assembly is moved laterally with respect to wall 22 in a direction opposite from the direction of assembly (e.g., to the right in FIGS. 1-2). The rounded edges of tangs 42,44 in accordance with the preferred embodiment of the disclosure, coupled with the angulated orientation of the tangs, help cam extension 40 with respect to wall 22 (downwardly in FIGS. 1 and 2) to facilitate disassembly of assembly 26 with respect to wall 22.

Figure 6:
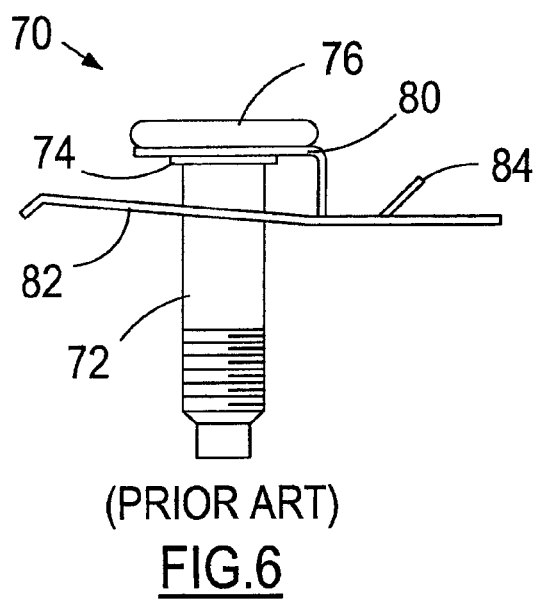
FIGS. 6 and 7 are a side elevational view and an exploded perspective view of a fastener assembly in accordance with the prior art.
Figure 7:
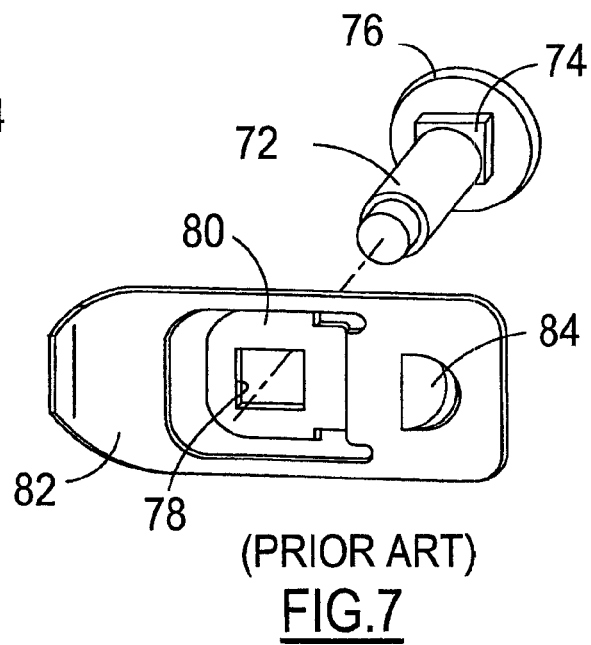

The fastener assembly so illustrated in FIGS. 1-5, in accordance with a presently preferred embodiment of the disclosure, may be contrasted with the prior art assembly 70 illustrated in FIGS. 6 and 7. In assembly 70, bolt 72 is of special construction, and has a non-round shoulder 74 on the underside of the head 76. Shoulder 74 is received in non-round opening 78 in the deck 80 of clip 82 so as to be exposed at the lower surface of the deck, as best seen in FIG. 6. Thus, when a nut or the like is tightened onto bolt 72, only the shoulder 76 contacts the wall to which the assembly is connected, as distinguished from the entire undersurface of flange 50 in FIG. 2. This, in turn, compromises the load and durability characteristics of the bolt 72. Indeed, one of the principal advantages of the present disclosure, in accordance with the presently preferred embodiment illustrated in FIGS. 1-5, is that the fastener 46 can be an off-the-shelf flange bolt, as distinguished from a specially manufactured bolt 72 in FIGS. 6-7. Use on an off-the-shelf bolt, preferably a flange bolt, thus not only maintains the load and durability characteristics of the bolt, but also reduces cost in that a special bolt does not have to be designed and made. Standard flange bolts are available in a variety of sizes and load characteristics. Full engagement of the bolt flange provides maximum fastener bearing area. Furthermore, the spaced angulated tangs 42,44 in the preferred embodiment of the disclosure provide improved operating and removal characteristics as compared with the single tang 84 in FIGS. 6 and 7.

There thus have been disclosed a fastener assembly, a fastener system and a method of making a fastener assembly that satisfy all of the objects and aims previously set forth. The disclosure has been presented in conjunction with a presently preferred embodiment, and a number of modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A fastener assembly that includes:
   a retainer clip having a flat base, a deck spaced from said base, a hexagonal opening on said deck and an opening in said base aligned with said hexagonal opening, and
   a flange bolt having a hexagonal head received through said opening in said base into said hexagonal opening in said deck, a flange disposed adjacent to said deck between said deck and said base, and an externally threaded body extending from said flange through said opening in said base, and including an extension on said base and at least one tang upstanding from said extension, said at least one tang including a pair of laterally spaced tangs on said extension at an acute angle to each other and having rounded edges remote from said deck.

2. The fastener assembly set forth in claim 1 wherein said hexagonal head of said flange bolt is secured to said deck by staked deformations at corners of said head.

3. A fastener system that includes:
   a wall having first and second mutually opposed surfaces and a keyhole-shaped opening in and extending between said surfaces, and
   a fastener assembly that includes: a retainer clip having a flat base against said first surface of said wall encircling said keyhole-shaped opening, a deck extending from said base through an enlarged portion of said keyhole-shaped opening to a position overlying said second surface of said wall, an extension from said base having a pair of laterally spaced tangs on said extension at an acute angle to each other and having rounded edges remote from said deck received in said enlarged portion of said keyhole-shaped opening and being configured to prevent rotation of said retainer clip with respect to said wall, and a hexagonal opening in said deck aligned with a small portion of said keyhole-shaped opening, and
   an off-the-shelf hex head flange bolt of standard size and shape having a hexagonal head received in said hexagonal opening in said deck to prevent relative rotation therebetween, said bolt having a flange encircling and protruding radially outwardly from said head and that is disposed between said deck and said second surface of said wall, and an externally threaded body extending axially from said bolt flange through said small portion of said keyhole-shaped opening in said wall and protruding outwardly and beyond said first surface for threadably receiving a threaded member thereon.

4. The fastener system set forth in claim 3 wherein said head is secured to said deck by staked deformations at corners of said head.

5. The fastener system set forth in claim 3 including an extension on said base adjacent to said enlarged portion of said keyhole-shaped opening and at least one tang upstanding from said extension within said enlarged portion of said keyhole-shaped opening to prevent rotation of said fastener assembly with respect to said wall.

6. A method of making a fastener assembly that includes the steps of:
   (a) providing a retainer clip having a flat base, a deck spaced from said base, a hexagonal opening in said deck and an opening in said base aligned with said hexagonal opening, an extension on said base and a pair of laterally spaced tangs upstanding from said extension and oriented at an acute angle to each other and having rounded edges remote from said deck,
   (b) providing a hex flange bolt having a hexagonal head, a flange disposed adjacent to said head and an externally threaded body extending from said flange,
   (c) inserting said hexagonal head and said flange through said opening in said base until said hexagonal head is received within said hexagonal opening in said deck, and then
   (d) securing said hexagonal head to said deck.

7. The method set forth in claim 6 wherein said step (d) is carried out by staking corners of said hexagonal head against said deck.

8. A fastener assembly that includes:
   a retainer clip having a base, a deck spaced from said base and an opening in said base aligned with said deck, and
   a threaded fastener having a head received through said opening in said base and non-rotatably secured to said deck, and an externally threaded body that extends from said head through said opening in said base, and wherein said fastener head is non-round in contour and is non-rotatably received in a non-round opening in said deck, wherein said non-round opening and said non-round head are hexagonal in shape, wherein said head is secured to said deck by staked deformation at corners on said head, wherein said fastener includes an integral flange disposed adjacent to an underside of said deck between said deck and said base, wherein said retainer clip includes an extension from said base and a pair of laterally spaced tangs upstanding from said extension, and wherein said tangs are disposed at an acute angle to each other.

9. The fastener assembly set forth in claim 8 wherein said tangs have rounded edges remote from said deck.

10. A fastener system that includes:

a wall having first and second mutually opposed surfaces and a keyhole-shaped opening in and extending between said surfaces, and a fastener assembly that includes:

a retainer clip having a flat base against said first surface of said wall, a deck extending from said base through an enlarged portion of said keyhole-shaped opening to a position overlying said second surface of said wall, an extension from said base having at least one tang received in said enlarged portion of said keyhole-shaped opening to prevent rotation of said retainer clip with respect to said wall, and a hexagonal opening in said deck aligned with a small portion of said keyhole-shaped opening, and a flange bolt having a hexagonal head received in said hexagonal opening in said deck, said bolt having a flange disposed between said deck and said second surface of said wall, and an externally threaded body extending axially from said flange through said small portion of said keyhole-shaped opening in said wall, and including an extension on said base adjacent to said enlarged portion of said keyhole-shaped opening and at least one tang upstanding from said extension within said enlarged portion of said keyhole-shaped opening to prevent rotation of said fastener assembly with respect to said wall, and wherein said at least one tang includes a pair of laterally spaced tangs on said extension at an acute angle to each other and having rounded edges remote from said deck.

* * * * *